Oct. 7, 1952  F. MASSA  2,613,261
UNDERWATER TRANSDUCER
Filed Dec. 8, 1948  2 SHEETS—SHEET 1
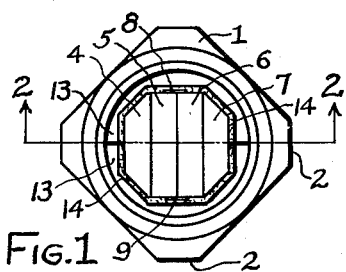
FIG.1
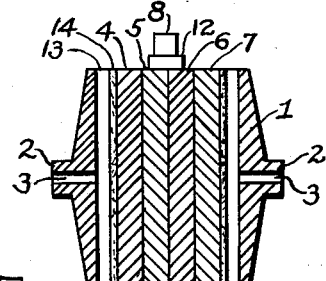
FIG.2
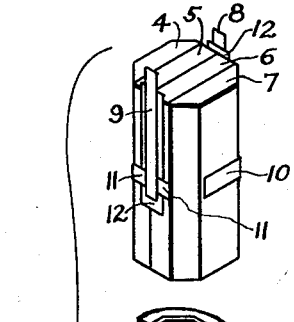
FIG.3
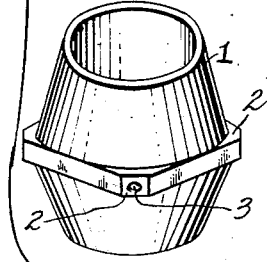
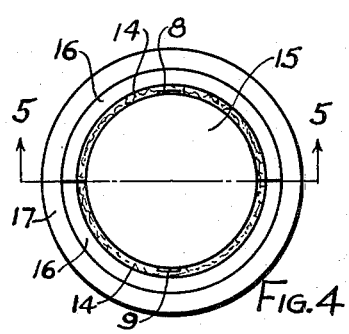
FIG.4
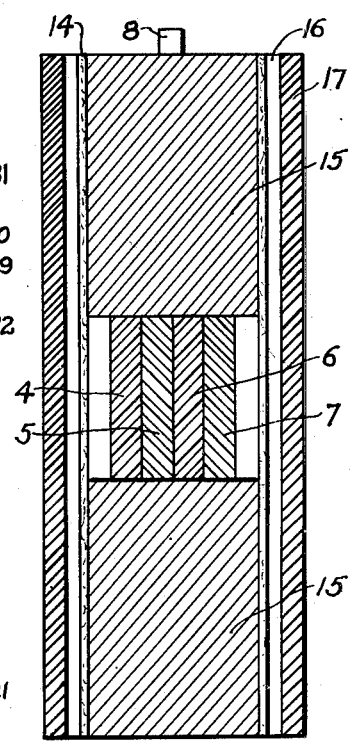
FIG.5
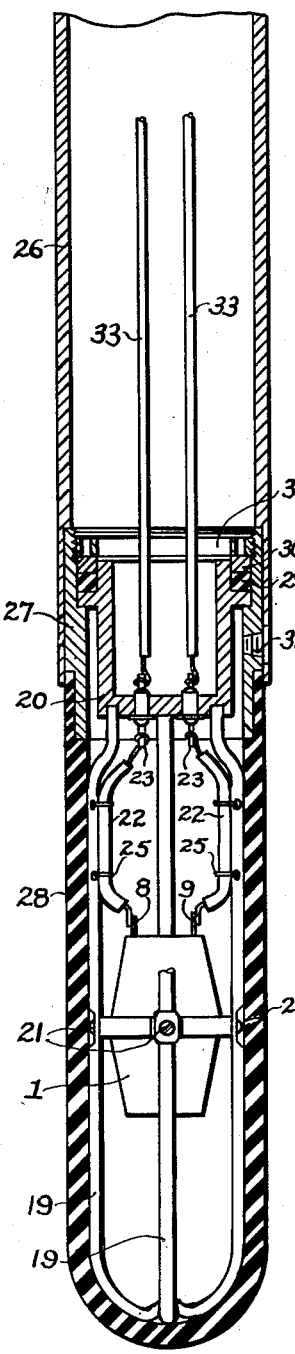
FIG.9
Inventor
Frank Massa Oct. 7, 1952  F. MASSA  2,613,261
UNDERWATER TRANSDUCER
Filed Dec. 8, 1948  2 SHEETS—SHEET 2
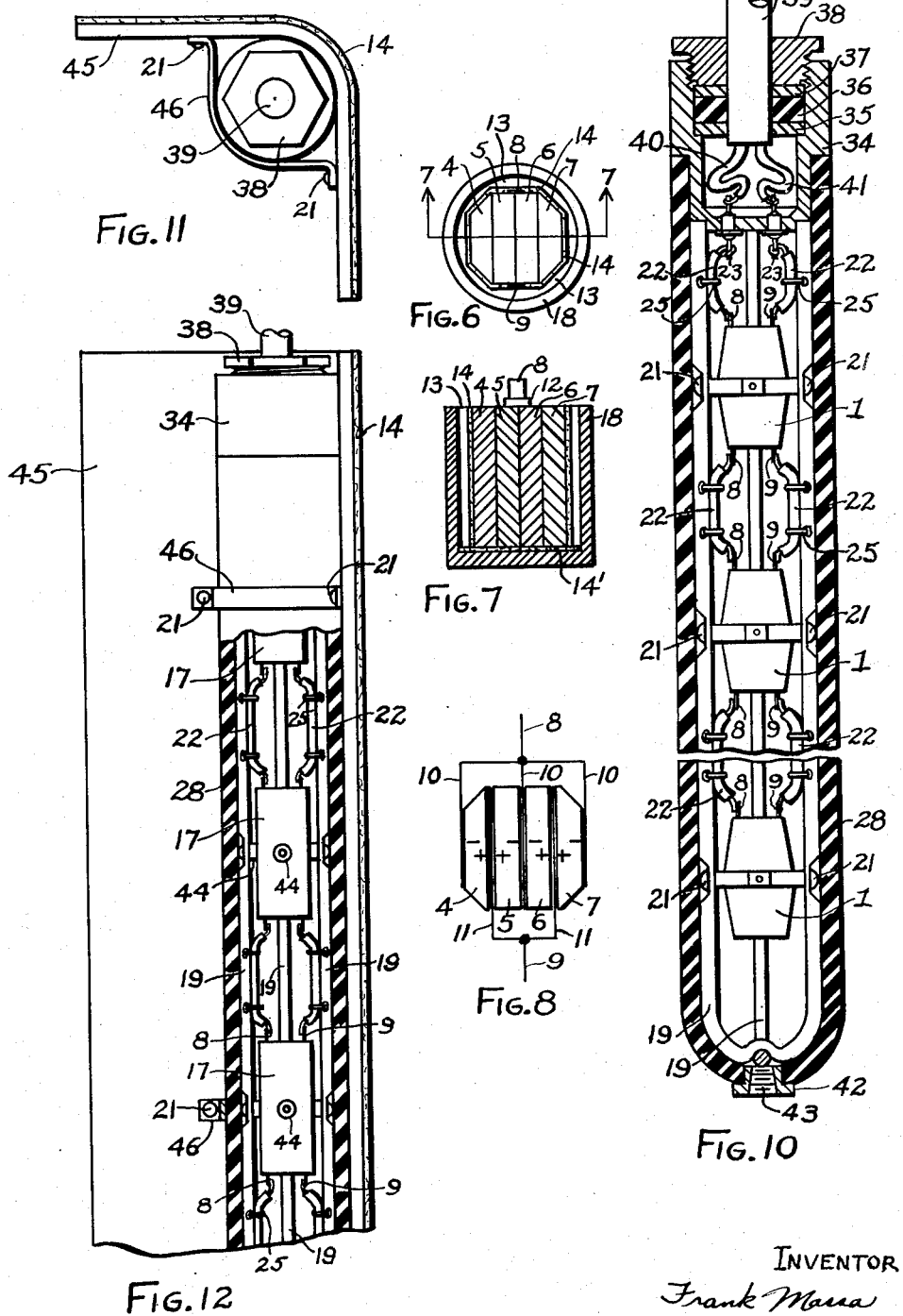
INVENTOR
Frank Massa Patented Oct. 7, 1952

2,613,261

UNITED STATES PATENT OFFICE 2,613,261

UNDERWATER TRANSDUCER

Frank Massa, Cleveland Heights, Ohio

Application December 8, 1948, Serial No. 64,148

10 Claims. (Cl. 177—386)

My invention is concerned with transducers which are capable of receiving or generating compressional waves in a liquid medium. An example of such a transducer is a hydrophone which converts underwater sound vibrations to electrical vibrations or, reciprocally, a structure which is actuated by an electrical signal and generates a corresponding sound signal. Two of the most common forms of transducer elements which are employed for generating or receiving sound waves in a liquid medium are piezo-electric crystals or magneto-striction elements. When transducer elements are designed for operation in the audible frequency range, it is generally necessary, in cases where the pressure sensitive element is responsive to sound pressure applied along more than one axis, to shield certain surfaces of the transducer element to prevent the undesired actuation of these surfaces by the sound pressure wave. For example, if a 45° X-cut or 45° Y-cut Rochelle salt crystal plate is immersed in a liquid medium and arranged so that sound pressure may simultaneously reach over all of its surfaces, the output voltage of the crystal will be practically zero for the frequency region in which the wavelength of sound in the medium is large compared with any of the crystal dimensions. This condition is well-known and results from the fact that equal pressures applied along the two right angle piezo-electrically sensitive axes of the crystal generate voltages which are equal in magnitude and opposite in phase, therefore neutralizing each other. If the sound pressure is prevented from being applied along one of the two sensitive crystal axes, the output voltage of the crystal will be proportional to the pressure applied along the other sensitive axis.

It is the primary object of my invention to improve the performance of an underwater transducer especially in the audible frequency range.

Another object of my invention is to produce a precision, low-cost assembly which is capable of operation in depths of water up to several hundred feet without appreciable change in operating characteristics.

Still another object of my invention is to provide a piezo-electric crystal assembly in which sound vibrations are prevented from reaching predetermined surfaces of the crystal structure for the purpose of improving the performance of the structure.

Another object of my invention is to provide a very accurately-dimensioned layer of a low acoustic impedance material between predetermined surfaces of a piezo-electric assembly and the walls of a surrounding housing.

A further object of my invention is to reduce the resonant frequency of a piezo-electric element whereby increased sensitivity results at the required lower frequency region.

Another object of my invention is to provide a simple, rugged mounting for my improved transducer assembly whereby minimum obstruction is presented to the sound field.

A further object of my invention is to provide a rugged, low-cost means for assembling a number of my improved transducer elements in order to obtain highly directional characteristics for the structure.

Another object of my invention is to assemble an improved structure in an efficient low-cost reflector whereby further control is achieved in the directional characteristic of the unit.

The novel features that I consider characteristic of my invention are set forth with particularity in the appended claims. The invention, itself, however, both as to its organization and method of operation, as well as additional objects and advantages thereof, will best be understood from the following description of several embodiments thereof when read in connection with the accompanying drawings, in which—

Fig. 1 is a plan view of one embodiment of my invention.

Fig. 2 is a section taken along the line 2—2 of Fig. 1.

Fig. 3 is an exploded view in perspective showing the structure of Fig. 1 in greater detail.

Fig. 4 is a plan view of another form of my invention.

Fig. 5 is a section taken along the line 5—5 of Fig. 4.

Fig. 6 is a plan view of still another form of my invention.

Fig. 7 is a section taken along the line 7—7 of Fig. 6.

Fig. 8 is a schematic wiring diagram showing the electrical connections as they are made in one type of piezo-electric crystal assembly.

Fig. 9 is a partial sectional view of a hydrophone embodying my improved transducer element.

Fig. 10 is a partial sectional view showing a line assembly of several of my improved transducer elements.

Fig. 11 is an end view showing one type of assembly of my transducer within an angular reflector to secure certain desired directional characteristics.

Fig. 12 shows a partial cut-away longitudinal view of the structure shown in Fig. 11.

Referring more particularly to the figures, in which the same reference character represents similar elements, and referring more specifically to Figs. 1, 2, and 3, reference character 1 is a a housing which has a cylindrical hole bored symmetrically along its longitudinal axis. The housing has a number of projections 2 through which the holes 3 are drilled to permit its assembly to a supporting frame. The characters 4, 5, 6, and 7 represent an assembly of piezo-electric crystal plates which are connected as indicated in Figs. 3 and 8 so that when mechanical vibrations are applied along the longitudinal axis of the crystal assembly, the individual voltages generated across each crystal plate are combined in proper phase relationship and appear across the output terminals 8 and 9. Some common types of piezo-electric crystals which would satisfy the above arrangement are, for example, 45° X-cut or 45° Y-cut Rochelle salt or 45° Z-cut ammonium di-hydrogen phosphate. The piezo-electric properties of such crystal plates are well-known and will not be described further in this specification.

The details of the crystal assembly are most clearly shown in the upper portion of the exploded perspective view of Fig. 3 taken in conjunction with the schematic wiring diagram which is shown in Fig. 8. The output terminal 8 is connected with the common potential terminals of the several crystal plates which are indicated by the minus sign in Fig. 8, and output terminal 9 is connected with the opposite common polarity of the crystal plates indicated by the plus signs in Fig. 8. The polarity indications in Fig. 8 represent the instantaneous charges developed on the side faces of the several crystal plates when a compressional stress is applied along the vertical axis of the crystal assembly when it is mounted as shown in Fig. 2. When the stress reverses its direction, the indicated polarity markings in Fig. 8 will also reverse. Thus an alternating voltage will appear across the output leads 8 and 9 corresponding to alternating pressures applied along the vertical axis of the crystal assembly when it is arranged as shown in Fig. 2. The leads 10 and 11 which are shown schematically in Fig. 8 and also shown in the top view of Fig. 3 employed for establishing electrical connection between the side crystal faces and the output terminals 8 and 9. The connections to the terminal 9 are made by the leads 11 and the connections to the terminal 8 are made by the leads 10. When the output terminals 8 and 9 are installed, an insulating film 12 is located between the output terminals and the crystal edges as shown in the upper portion of Fig. 3.

It is well-known that if an assembly of crystal plates, such as are shown in the top view of Fig. 3, employing 45° X-cut or 45° Y-cut Rochelle salt or 45° Z-cut ammonium di-hydrogen phosphate is immersed in a sound field, the sound pressure which would act simultaneously on all faces of the crystals throughout the lower frequency range would result in practically zero electrical output. In order to avoid the loss in low-frequency output from such a crystal assembly, it has been common practice to mount such an assembly inside a housing and to seal off the housing by means of diaphragms which also make contact with a pair of crystal faces on opposite ends of a piezo-electrically sensitive axis of the crystal. Such a structure, for example, is shown in Fig. 2 of Patent No. 2,413,462 issued to Frank Massa on December 31, 1946. This type of construction shields the sides of the crystal from exposure to the sound field, and although improving the low-frequency performance of the assembly, possesses the disadvantage that it may be mechanically weak and may not withstand shock or submergence in static pressures of great magnitude. A further disadvantage of such an arrangement, particularly in the case of 45° X-cut Rochelle salt, is that when the assembly is subjected to high static pressure, the static pressure will be applied only along one axis of the crystal assembly instead of all over the crystal simultaneously such as would occur if the diaphragms were missing. Such a uni-laterally applied static stress would result in serious non-linearity in the operation of the 45° X-cut Rochelle salt crystals.

Another method which has been employed for improving the construction of a crystal hydrophone has been to cover the sides of the crystals with low acoustic impedance material and, after placing the covered crystals into an open metallic sleeve, to immerse the assembly inside an oil-filled container so that sound pressure applied to the outer wall of the container would be transmitted directly to the crystal structure mounted within it. For this type of construction, the hydrostatic pressure, when the hydrophone is submerged, is applied uniformly along all axes of the crystal structure. However, because it was not realized that the low acoustic impedance material has to be relatively thin and completely fill the space between the sides of the crystals and the housing, the performance of such a hydrophone structure was quite variable in the lower audible frequencies in the region below 1000 cycles/second. For hydrophones that had to operate satisfactorily very much below 1000 cycles/second, it was found necessary to employ diaphragms which sealed off the side faces of the crystal from the sound field and thereby caused the sound pressure to be applied substantially along a single axis of the crystal assembly.

In order to obtain uniform sensitivity in the lower audible frequency range extending down to frequencies below 100 cycles/second, I have found it possible to completely eliminate the use of the diaphragms if a thin layer of low acoustic impedance material is provided between the side surfaces of the crystal assembly and a rigid shell. I also found it necessary to completely fill the space between the side faces of the crystal assembly and the inner wall of the rigid shell. The thickness of the layer of low impedance acoustic material which is required for maintaining uniform sensitivity at the lower audio frequencies is less than 20% of the assembled crystal dimension measured along a line perpendicular to the low acoustic impedance film, and to secure uniform sensitivity to frequencies below 100 cycles/second, I found it desirable to employ film thicknesses of the order of 10% or less of the total crystal dimension above mentioned.

In order to achieve my desired objective of providing an accurately-controlled thin film of low acoustic impedance material between the side surfaces of my crystal assembly and a rigid housing structure, I found it desirable to use the construction illustrated in Figs. 1, 2, and 3. Two semicircular shells 13 which combine to form a true circular outer contour, have an inner shape that conforms accurately with the outer contour of the crystal assembly. A layer of low acoustic impedance material 14 is cemented to the inner surface of the shells 13, as illustrated in the center view of Fig. 3. A suitable type of low acoustic impedance material is a mixture of granulated cork and rubber which is molded together to form a compressible sheet. The thickness of the material 14 is machined to a uniform dimension and it is adjusted so that when the final assembly is made, as indicated in Figs. 1 and 2, the material 14 is slightly compressed so that it very completely fills the space between the crystal assembly and the inner wall of the shells 13. An outer rigid structure 1 is provided with a hole along its axis within which the assembled shells 13 can be forced. Near the center of the outer portion of housing 1 are provided four extension surfaces 2 with a hole 3 drilled through each surface for use in mounting the assembled transducer element as will be described later.

After preparing the crystal assembly as shown in the top view of Fig. 3, two shells 13 which have been lined with the low acoustic impedance material 14 are assembled to enclose the side surfaces of the crystal assembly and this composite structure is then forced into the axial hole provided in the housing 1 so that a complete transducer element results, as shown in the views of Figs. 1 and 2. If this transducer element is immersed in a liquid, such as castor oil or silicone fluid, which is non-injurious to the crystals, and sound waves are set up within the liquid, only the exposed end faces of the crystals will be activated by the sound pressure because the side crystal faces are effectively isolated by the construction just described. The thin film of low acoustic impedance material 14 serves the dual function of permitting the transmission of static pressure along all axes of the crystals whereas it prevents alternating sound pressures corresponding to the lower audible frequencies from reaching the side faces of the crystal assembly. Since only the uncovered end faces of the crystal assembly remain effectively exposed to the action of the alternating sound pressure, alternating stresses will only be set up in the crystals along the vertical axis of Fig. 2, thereby generating electrical signals across the terminals 8 and 9 which correspond to the frequency and wave shape of the sound pressure waves. By constructing the crystal assembly as described above with a film of low acoustic impedance material completely filling the space between the sides of the crystals and the surrounding rigid wall, I found that the sensitivity of the transducer element when used as a hydrophone was uniform to very low frequencies down to 30 cycles or less. I also found it advantageous to make the length of the crystals greater than their width dimensions in which case the resulting long axial length of the low acoustic impedance film as compared with its thickness helps to achieve the improved performance at the very low audible frequencies.

A modification of the construction shown in Figs. 1, 2, and 3 is indicated in Figs. 4 and 5 in which the main crystal assembly 4, 5, 6, and 7 is cemented between two cylindrical rods 15. The composite assembly of the crystal plates and the rods 15 is held between two semi-circular shells 16 which are lined with a thin film of low acoustic impedance material 14 which is the same as the material described in connection with the previous assembly. With the crystals and the end pieces 15 held between the two lined semi-circular shells 16, the entire structure is forced into a cylindrical tube 17 to complete the transducer assembly. For the lower audible frequency range, the addition of the rods 15 to the end faces of the crystal assembly causes no appreciable change in performance of the transducer. At some predetermined higher audible frequency, the use of the composite structure results in greatly increased output. The frequency at which this increased output results lies in the vicinity of the resonant frequency of the composite length of the crystal plates plus the two attached rods 15. The reason for employing this type of construction to achieve resonance in the audible frequency range is that it is impractical to obtain crystal plates long enough to resonate by themselves at frequencies much lower than 15 kc. By attaching rods to the end of the crystals, the resonant frequency of the combined structure may be set as low as several hundred cycles, if desired.

A still further type of construction employing my improved method of mounting the crystals within a housing is indicated in Figs. 6 and 7. In these figures, the same group of crystals 4, 5, 6, and 7 as were used in Figs. 1 and 2 are mounted within the same two shells 13 which are lined with the low acoustic impedance material 14. The outer housing 18 in this case has only one open end, and when the crystal and shell assembly is forced into the opening of the housing 18, only one end face of the crystal assembly remains exposed for actuation in the sound field. As shown in Fig. 7, a disc of low acoustic impedance material 14' is shown intermediate between the inside bottom surface of the housing 18 and one of the end faces of the crystal assembly. The essential difference between the construction of Figs. 6 and 7 as compared with the construction described in the previous figures is that the directional characteristic of the construction of Figs. 6 and 7 will be essentially that of a plane piston having the contour shown by the outer periphery of the crystal assembly, as indicated in the plan view of Fig. 6. In the previous structures, both ends of the crystal assembly are exposed to actuation by the sound field and, therefore, the directional patterns in these arrangements will be equivalent to that corresponding to a pair of piston sources displaced axially corresponding to the total length of the transducer element assembly.

Fig. 9 is a partial sectional view indicating one method which I have successfully employed for mounting the transducer element above described to make a satisfactory operating hydrophone in which the mounting structure offers minimum obstruction to the sound field. The housing 1 which contains the active portion of the transducer element is mounted between two U-shaped wire rods 19 which are rigidly secured to the flange portion 20. Four drive screws 21 are employed for fastening the housing 1 securely to the wire frame, as indicated. The wire frame has flattened portions in the region where the drive screws are employed. The crystal output terminals 8 and 9 are soldered to the conductors 22 and the other ends of the conductors are soldered to the insulated terminals 23 which are, in turn, sealed to the housing 20. Loops of wire 25 are employed for holding the conductors 22 securely against the wire frame, as indicated. The transducer assembly comprising the flange portion 20, together with the wire frame structure and the transducer element, is inserted into the outer housing structure through the opening in the cylindrical tube 26. The tube 26 is soldered to a second portion 27 and a rubber boot 28 is bonded to the portion 27, as indicated in the view.

When the transducer assembly is inserted through the opening in the tube 26, the outer ring of the flange portion 20 will sit on the shoulder provided in part 27. A sealing gasket 29 and a clamp ring 30 are then dropped into position, as shown, and a ring nut 31 is screwed into the threads which are formed on the inner surface of part 27, as indicated, to hermetically seal the complete assembly within the space into which the transducer element is mounted. After the ring nut 31 is securely fastened, the space inside the rubber jacket is evacuated through the pipe tap 32. After completely removing the air from the inner compartment, a suitable sound conducting liquid such as castor oil or silicone fluid is injected into the space through the opening 32 and a pipe plug is then inserted in the opening 32 to seal the liquid within the chamber. In order to completely fill the housing with the liquid, it is preferable to employ a rigid sleeve surrounding the outer surface of the rubber boot 28 and to create a vacuum between the outer wall of the rubber boot and the external sleeve for the purpose of preventing the collapse of the rubber boot during the evacuation of its inner volume. Two flexible leads 33 are soldered to the exposed ends of the insulated terminals 23 as indicated and they serve to permit external connection to the transducer terminals 8 and 9 which are enclosed in the liquid-filled compartment. The space within the tubular portion 26 may be employed for mounting a preamplifier for applications in which the transducer element is employed as a hydrophone and in which the preamplifier is usually necessary. If the preamplifier is not required, the length of the cylindrical housing 26 may be shortened and a waterproof sealing arrangement for the cable may be provided similar to that shown in the top view of Fig. 10.

In Fig. 10, is shown an arrangement in which a number of transducer elements similar to the element mounted in Fig. 9 are arranged to form a long line of elements which are all connected electrically together and thereby result in sharp directional characteristics for sounds arriving in any plane containing the vertical axis of the line. In Fig. 10, two U-shaped wire structures 19 are employed similar to those shown in Fig. 9 except that in Fig. 10, the wire U's are made longer and provisions are made for receiving several of the housings 1, as indicated. The housings 1 are secured to the wire rods by means of the drive screws 21, as previously described in connection with Fig. 9. The crystal terminals 8 and 9 extend through both the top and bottom portion of most of the housings 1 in order to permit the parallel connection of all the terminals by means of the wires 22, as shown. Wire clamps 25 are employed for securing the conductors 22 to the U-shaped rods 19 in the same manner as described in connection with Fig. 9. The wire rods 19 are secured to the flange portion 34 and the electrical connections from the transducer elements are made through the insulated terminals 23 which seal off the enclosure containing the transducer elements from the outside region. A rubber sleeve 28 is sealed to the surface of portion 34 after the transducer elements are assembled in place. The inside surface of the portion 34 is machined to receive a washer 35, a packing gland 36, and a second washer 37, as indicated, and a nut 38 which is screwed into the portion 34 will serve to compress the packing gland 36 to effect a water-tight seal between the cable 39 and the inner wall of the portion 34. The two cable conductors 40 and 41 are connected to the exposed ends of the terminals 23, as shown. A bushing 42 which contains the pipe tap 43 is bonded to the rubber boot 28 and is employed as the means for evacuating and oil-filling the transducer structure in the same manner as described in connection with evacuation and filling of the assembly of Fig. 9.

Another form of a line type assembly is shown in Figs. 11 and 12. In this case, a number of housing structures 17 carrying the active assemblies described in Fig. 5 are mounted between the rods 19 as previously described in Fig. 10. Small spacing members 44 are fastened to the outer periphery of the housings 17, as shown, and they serve to keep the housings 17 centered between the rods 19. The complete assembly of the cylindrical line type transducer employs the same construction described in Fig. 10. In Figs. 11 and 12, however, the line assembly is shown mounted along the corner of an angular reflector plate 45 and held in position by the brackets 46 and the drive screws 21. A layer of low acoustic impedance material 14 covers the rear portion of the reflector, as shown, and serves to attenuate the sound which would otherwise pass through the rear of the reflector plate were the low acoustic impedance material 14 omitted. For the transducer construction indicated in Figs. 11 and 12, the effective sound pickup angle in a plane normal to the axis of the line will be essentially as defined by the angular opening of the reflector plate 45 for frequencies in which the wavelength of sound is large when compared with the dimension of the opening across the reflector.

Although I have chosen only a few specific examples to illustrate the basic principles of my invention, it will be obvious to those skilled in the art that numerous departures may be made from the details shown and I, therefore, desire that my invention shall not be limited except insofar as is made necessary by the prior art and by the spirit of the appended claims.

I claim as my invention:

1. In an underwater transducer capable of generating or receiving sound waves in the lower audible frequency range, an assembly of one or more piezo-electric crystal elements, each element having a pair of end faces and a number of side faces, each element characterized in that an electrical voltage will be generated within the element by the application of an alternating mechanical pressure along an axis normal to said pair of end faces and also along an axis at right angles to said normal axis, a rigid walled housing structure having at least one open end surrounding said crystal assembly, the inner wall of said housing structure being closely spaced from at least one of the side faces of said crystal assembly, at least one of the end faces of said crystal assembly being exposed through the open end of said housing and a layer of material of lower acoustic impedance than the crystal substance substantially filling the space between the inner wall of said housing and the side face of the crystal element mounted within said housing, the thickness of said low acoustic impedance material being of the order of 10% or less of the crystal element dimension measured in a direction at right angles to the surface of said low acoustic impedance material.

2. In an underwater transducer capable of generating or receiving sound waves in the audible frequency range, the combination of a piezo-electric crystal element having a pair of end faces and a number of side faces, a number of rigid shell-like sections having an outer contour and an inner contour, the inner contour of said shell-like sections conforming to the outer contour of a portion of the periphery formed by the side faces of said crystal element, a layer of material lining the inner contour of the said shell-like sections, said material having a lower acoustic impedance than the acoustic impedance of the crystal substance, said lined shell-like sections arranged to surround the side faces of said crystal element whereby said low acoustic impedance layer is held in close contact with the side faces of said crystal element and a housing structure having an opening within which said assembly of lined shell-like sections together with the enclosed crystal element is firmly held.

3. The invention described in claim 2 characterized in that the thickness of said layer of low acoustic impedance material is of the order of 10% or less of the dimension of the crystal element measured in a direction at right angles to the surface of said low acoustic impedance material.

4. The invention described in claim 2 characterized in that said thickness of said layer of low acoustic impedance material is of the order of 10% or less of the dimension of the crystal element measured in a direction at right angles to the surface of said low acoustic impedance material, and further characterized in that said low acoustic impedance material is compressed during assembly whereby the entire space between the inner contour of the said shell-like sections and the side faces of said crystal element is completely filled.

5. The invention described in claim 2 characterized in that the thickness of said layer of low acoustic impedance material is of the order of 10% or less of the dimension of the crystal element measured in a direction at right angles to the surface of said low acoustic impedance material, and further characterized in that the length of said crystal element is greater than the width of said crystal element measured along any direction perpendicular to the surface of said low acoustic material which surrounds the side faces of said crystal element.

6. In a transducer capable of generating or receiving sound waves in a liquid in the lower audible-frequency range, a transducer element capable of converting alternating pressures to alternating voltages, a housing structure within which said transducer element is mounted, a frame-like support surrounding said housing structure, said frame-like support comprising an assembly of rod-like members whose width dimensions are small compared with the width of said housing structure, means for rigidly attaching said housing structure to said frame-like support, an outer enclosure within which said assembled housing structure and frame-like support is mounted, sealed terminal means for establishing electrical connection to the transducer element within said outer enclosure, and a sound conducting substance filling the space between said transducer element and the inner surface portion of said surrounding enclosure.

7. The invention set forth in claim 6 characterized in that said transducer element comprises an assembly of several piezo-electric crystal elements, each mounted within a separate rigid tubular housing structure.

8. The invention set forth in claim 6 characterized in that said transducer element comprises a line assembly of separate transducer elements, an angular reflector plate surrounding said line assembly, and means for securing said line assembly along the vertex of said angular reflector plate.

9. In a transducer capable of generating or receiving sound waves in a liquid in the lower audible-frequency range, the combination of a housing structure with a normal axis whose dimension is greater than the dimensions of the housing in a plane at right angles to said normal axis, a plurality of transducer elements having more than one axis along which an applied mechanical alternating pressure will generate an alternating electrical voltage, rigid wall-like surfaces closely spaced to at least a pair of surfaces of said transducer elements, and a layer of material having a lower acoustic impedance than the substance of the transducer element mounted within the spaces between said wall-like surfaces and said faces of said transducer elements.

10. In an underwater transducer capable of generating or receiving sound waves in the audible-frequency range, the combination of a piezoelectric crystal element having a pair of end faces and a number of side faces, a number of rigid shell-like sections having an outer contour and an inner contour, a layer of material lining the inner contour of the said shell-like sections, said material having a lower acoustic impedance than the acoustic impedance of the crystal substance, said lined shell-like sections arranged to surround the side faces of said crystal element and means for holding said shell-like sections in fixed relationship with said crystal element whereby said low acoustic impedance material is held in close contact with said crystal element.

FRANK MASSA.

REFERENCES CITED

The following references are of record in the file of this patent:

UNITED STATES PATENTS

| Number | Name | Date |
|---|---|---|
| 1,985,251 | Hayes | Dec. 25, 1939 |
| 2,076,330 | Wood et al. | Apr. 6, 1937 |
| 2,138,036 | Kunze | Nov. 29, 1938 |
| 2,405,605 | Goodale et al. | Aug. 13, 1946 |
| 2,413,462 | Massa (C) | Dec. 31, 1946 |
| 2,414,489 | Shomer | Jan. 21, 1947 |
| 2,417,829 | Keller | Mar. 25, 1947 |
| 2,435,548 | Rosenthal | Feb. 3, 1948 |
| 2,440,903 | Massa | May 4, 1948 |
| 2,456,294 | Massa | Dec. 14, 1948 |
| 2,480,535 | Alois et al. | Aug. 30, 1949 |